United States Patent
Jain et al.

(10) Patent No.: US 12,248,696 B2
(45) Date of Patent: Mar. 11, 2025

(54) TECHNIQUES TO REPURPOSE STATIC RANDOM ACCESS MEMORY ROWS TO STORE A LOOK-UP-TABLE FOR PROCESSOR-IN-MEMORY OPERATIONS

(71) Applicant: Intel Corporation, Santa Clara, CA (US)

(72) Inventors: Saurabh Jain, Bengaluru (IN); Srivatsa Rangachar Srinivasa, Hillsboro, OR (US); Akshay Krishna Ramanathan, State College, PA (US); Gurpreet Singh Kalsi, Bangalore (IN); Kamlesh R. Pillai, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 17/340,866

(22) Filed: Jun. 7, 2021

(65) Prior Publication Data
US 2022/0391128 A1    Dec. 8, 2022

(51) Int. Cl.
*G06F 3/06* (2006.01)
*G06F 7/523* (2006.01)

(52) U.S. Cl.
CPC .......... *G06F 3/0655* (2013.01); *G06F 3/0604* (2013.01); *G06F 3/0673* (2013.01); *G06F 7/523* (2013.01)

(58) Field of Classification Search
CPC .... G06F 3/0655; G06F 3/0604; G06F 3/0673; G06F 7/523
See application file for complete search history.

(56) References Cited

U.S. PATENT DOCUMENTS

2019/0042160 A1* 2/2019 Kumar ................. G06F 3/0659
2021/0111722 A1* 4/2021 Kalsi .................. H03K 19/1776

OTHER PUBLICATIONS

"Micro 2020: Main Program," 53rd IEEE/ACM International Symposium on Microarchitecture, Oct. 17-21, 2020, Available online: https://www.microarch.org/micro53/program/ (21 pages).

A. K. Ramanathan et al., "Look-Up Table based Energy Efficient Processing in Cache Support for Neural Network Acceleration," 2020 53rd Annual IEEE/ACM International Symposium on Microarchitecture (Micro), Athens, Greece Oct. 17-21, 2020, pp. 88-101, doi: 10.1109/Micro50266.2020.00020 (14 pages).

Ali Shafiee et al., "Isaac: A Convolutional Neural Network Accelerator with In-Situ Analog Arithmetic in Crossbars," In Proceedings of the 43rd International Symposium on Computer Architecture, ISCA '16, pp. 14-26, Piscataway, NJ, USA, Oct. 5, 2016. IEEE Press (13 pages).

Charles Eckert et al., "Neural Cache: Bit-Serial In-Cache Acceleration of Deep Neural Networks," In Proceedings of the 45th Annual International Symposium on Computer Architecture, ISCA '18, pp. 383-396, Piscataway, NJ, USA, May 9, 2018. IEEE Press (14 pages).

(Continued)

*Primary Examiner* — David Yi
*Assistant Examiner* — Alan Otto
(74) *Attorney, Agent, or Firm* — Compass IP Law PC

(57) ABSTRACT

Example compute-in-memory (CIM) or processor-in-memory (PIM) techniques using repurposed or dedicated static random access memory (SRAM) rows of an SRAM sub-array to store look-up-table (LUT) entries for use in a multiply and accumulate (MAC) operation.

25 Claims, 11 Drawing Sheets

(56) References Cited

OTHER PUBLICATIONS

Daichi Fujiki et al., "Duality Cache for Data Parallel Acceleration," In Proceedings of the 46th International Symposium on Computer Architecture, ISCA '19, pp. 397-410, New York, NY, USA, Jun. 22-26, 2019. ACM (14 pages).

J. Wang et al., "A 28-nm Compute SRAM With Bit-Serial Logic/Arithmetic Operations for Programmable In-Memory Vector Computing," IEEE Journal of Solid-Slate Circuits, 55(1):76-86, Jan. 2020 (11 pages).

Jingyang Zhang, "Exploring Bit-Slice Sparsity in Deep Neural Networks for Efficient ReRAM-Based Deployment," arXiv:1909.08496v2 [cs.LG], Nov. 19, 2019 (5 pages).

P. Hung et al., "Fast Division Algorithm with a Small Lookup Table," In Conference Record of the Thirty-Third Asilomar Conference on Signals, Systems, and Computers (Cal. No. CH37020), vol. 2, pp. 1465-1468 vol. 2, Oct. 24-27, 1999 (4 pages).

Ping Chi et al., "PRIME: A Novel Processing-in-memory Architecture for Neural Network Computation in ReRam-based Main Memory," In 2016 ACM/IEEE 43rd Annual International Symposium on Computer Architecture (ISCA), pp. 27-39, Jun. 2016 (13 pages).

Shaizeen Aga et al., "Compute Caches," In 2017 IEEE International Symposium on High Performance Computer Architecture (HPCA), pp. 481-492, Feb. 2017 (12 pages).

Song Han et al., "EIE: Efficient Inference Engine on Compressed Deep Neural Network," In Proceedings of the 43rd International Symposium on Computer Architecture, ISCA '16, p. 243-254. IEEE Press, Jun. 2016 (12 pages).

Supreet Jeloka et al., "A 28 nm Configurable Memory (TCAM/BCAM/SRAM) Using Push-Rule 6T Bit Cell Enabling Logic-in-Memory," IEEE Journal of Solid-Slate Circuits, 51(4):1009-1021, Apr. 2016 (13 pages).

Y. Bengio and J. Senecal, "Adaptive Importance Sampling to Accelerate Training of a Neural Probabilistic Language Model," IEEE Transactions on Neural Networks, 19(4):713-722, Apr. 2008 (10 pages).

Yoshua Bengio, Nicholas Leonard, and Aaron Courville, "Estimating or Propagating Gradients Through Stochastic Neurons for Conditional Computation," arXiv:1308.3432v1 [cs.LG], Aug. 15, 2013 (12 pages).

\* cited by examiner

Configuration Block 600

| Start Address 610 | End Address 620 | Operation 630 | Iteration 640 | Bit-Precision 650 |
|---|---|---|---|---|

*FIG. 6*

TECHNIQUES TO REPURPOSE STATIC RANDOM ACCESS MEMORY ROWS TO STORE A LOOK-UP-TABLE FOR PROCESSOR-IN-MEMORY OPERATIONS

TECHNICAL FIELD

Descriptions are generally related to a compute-in-memory (CIM) or processor-in-memory (PIM) techniques using repurposed or dedicated static random access memory (SRAM) rows of an SRAM sub-array to store a look-up-table (LUT).

BACKGROUND

Computer artificial intelligence (AI) has been built on machine learning, particularly using deep learning techniques. With deep learning, a computing system organized as a neural network computes a statistical likelihood of a match of input data with prior computed data. A neural network or deep neural network (DNN) refers to a plurality of interconnected processing nodes that enable the analysis of data to compare an input to "trained" data. Trained data refers to computational analysis of properties of known data to develop models to use to compare input data. An example of an application of AI and data training is found in object recognition, where a system analyzes the properties of many (e.g., thousands or more) of images to determine patterns that can be used to perform statistical analysis to identify an input object such as a person's face.

DNNs compute "weights" to perform computations on new data (an input data "word"). DNNs may use multiple layers of computational nodes, where deeper layers perform computations based on results of computations performed by higher layers. Machine learning currently relies on the computation of dot-products and absolute difference of vectors, typically computed with multiply and accumulate (MAC) operations performed on the parameters, input data and weights. Because these large DNNs may include many such data elements, these data elements are typically stored in a memory separate from processing elements that perform the MAC operations.

Due to the computation and comparison of many different data elements, machine learning is extremely compute intensive. Also, the computation of operations within a processor are typically orders of magnitude faster than the transfer of data between the processor and memory resources used to store the data. Placing all the data closer to the processor in caches is prohibitively expensive for the great majority of practical systems due to the need for large data capacities of close proximity caches. Thus, the transfer of data when the data is stored in a memory separate from processing elements becomes a major bottleneck for AI computations. As the data sets increase in size, the time and power/energy a computing system uses for moving data between separately located memory and processing elements can end up being multiples of the time and power used to actually perform AI computations.

BRIEF DESCRIPTION OF THE DRAWINGS

FIG. 6 illustrates an example configuration block.

DETAILED DESCRIPTION

A relatively new technology known as compute-in-memory (CIM) or processor-in-memory (PIM) attempts to both reduce energy for data movement and increase an effective memory bandwidth for data consumed in deep-learning applications. Some types of memory such as static random access memory (SRAM) may include PIM circuitry that enables the SRAM to serve as an accelerator to execute operations such as dot-product and absolute difference of vectors locally stored within an array of memory cells (e.g., bitcells) without having to send data to a host processor or central processing unit (CPU). Use of PIM circuitry in SRAM for deep-learning applications reduces the amount of data that is typically transferred between system memory and compute resources. The reduction in data movement accelerates the execution of algorithms associated with deep-learning applications that may be memory bandwidth limited if not for the use of a PIM circuitry. The reduction in data movement also reduces overall energy consumption associated with data movement within the computing device.

In some examples, SRAM-based PIM accelerators targeted for various deep-learning applications may perform MAC operations using MAC circuitry or MAC arrays near SRAM memory cells for dot-product operations, neuron activations or weight matrices. However, MAC arrays with associated control circuitry require a substantial amount of area relative to an SRAM array. Look-up-table (LUT) based approaches may do away with a need for MAC arrays, but repeated accesses to LUTs maintained in an entire SRAM array may consume a significant amount of energy and limit efficiencies of SRAM-based PIM accelerators. As described more below, example approaches are disclosed that mitigate high energy and reduced efficiencies via use of separate bitlines and precharge circuitry for a relatively small region of a SRAM sub-array partition for storing LUT entries to be used in PIM operations.

Figure 1:
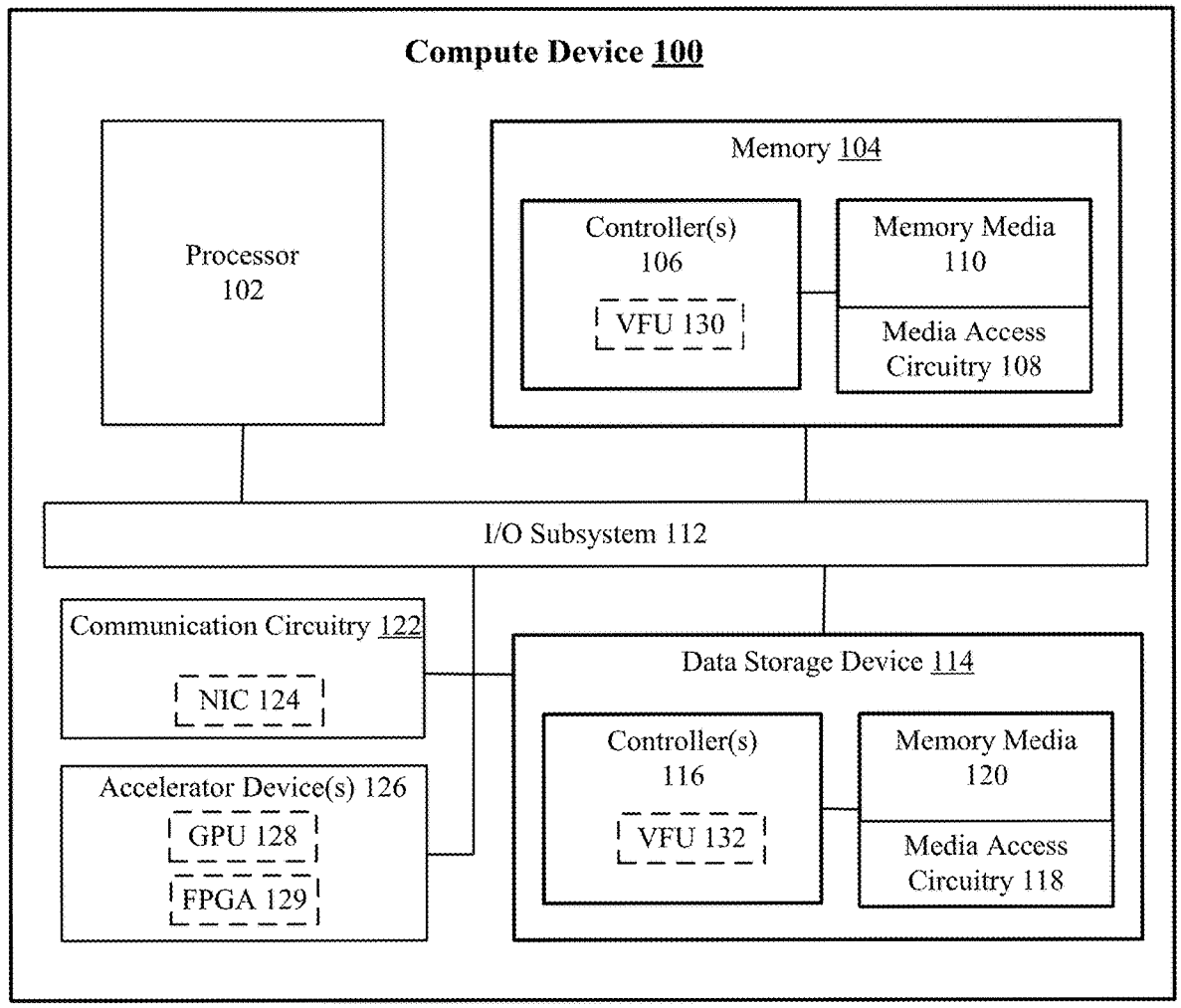
FIG. 1 illustrates an example compute device.

FIG. 1 illustrates an example compute device 100. In some examples, as shown in FIG. 1, compute device 100 includes a processor 102, a memory 104, an input/output (I/O) subsystem 112, a data storage device 114, communication circuitry 122, and one or more accelerator device(s) 126. Memory 104 of FIG. 1 includes one or more controller(s) 106, media access circuitry 108, and memory media 110. Also, as shown in FIG. 1, controller(s) 106 of memory 104 may include an example vector function unit (VFU) 130. Data storage device 114, as shown in FIG. 1, may include one or more controller(s) 116, media access circuitry 118, and memory media 120. Also, as shown in FIG. 1, controller(s) 116 may include an example VFU 132. Communication circuitry 122, in some examples, includes a network interface controller (NIC) 124. Also, as shown in FIG. 1, accelerator device(s) 126 may include a graphics processing unit (GPU) 128 or a field programmable gate array (FPGA) 129.

In other examples disclosed herein, compute device 100 may include other and/or additional components. For example, compute device 100 may be in communication with components such as those commonly found in association with a computer (e.g., a display, peripheral devices, etc.).

According to some examples, the term "memory," as used herein in reference to performing compute-in-memory (CIM) or processor-in-memory (PIM) multiply and accumulate operations, may refer to memory 104 and/or data storage device 114, unless otherwise specified. As explained in more detail below, example media access circuitry 108 or 118 (e.g., any circuitry or device configured to access and operate on data in the corresponding memory media 110, 120) coupled with a corresponding memory media 110, 120 (e.g., any device or material that data is written to and read from) may access (e.g., read) data within the corresponding memory media 110, 120 to support general operations of processor 102. In some examples, processor 102 may request that media access circuitry 108, 118 perform one or more MAC operations. In such examples, media access circuitry 108, 118 forwards the instructions to perform one or more MAC operations to memory media 110, 120 for CIM or PIM operations. Also, as described in more detail below, compute circuitry within memory media 110, 120 may access one or more operands (e.g., values on which to operate) or elements thereof (e.g., one or more 4-bit elements) of vectors and/or matrices to be operated on during the one or more MAC operations. After performing the one or more MAC operations, the compute circuitry within memory media 110, 120 may store the results in the memory media 110, 120 and/or outputs the results to media access circuitry 108, 118 and/or processor 102.

In some examples, media access circuitry 108 may be included in a same die as memory media 110. In other examples, media access circuitry 108 may be located on a separate die but in the same package as memory media 110. In yet other examples, media access circuitry 108 may be located in a separate die and separate package but on a same dual in-line memory module (DIMM) or board as memory media 110.

According to some examples, processor 102 may be implemented as any device or circuitry (e.g., a multi-core processor(s), a microcontroller, central processing unit (CPU) and/or other processor or processing/controlling circuit) capable of performing operations described herein, such as executing an application (e.g., an artificial intelligence related application that may be enabled by execution of MAC operations). In some examples, processor 102 may be implemented as, be in circuit with, or include an FPGA, an application specific integrated circuit (ASIC), reconfigurable hardware or hardware circuitry, or other specialized hardware to facilitate performance of functions described herein.

In some examples, memory 104 that includes memory media 110 and media access circuitry 108 (e.g., a device or circuitry, such as a processor, ASIC, or other integrated circuitry constructed from complementary metal-oxide-semiconductors (CMOS) or other materials) in circuit with memory media 110. Media access circuitry 108 may also be part of or executed by a same circuitry as controller(s) 106. This same circuitry may include a processor, a co-processor, dedicated circuitry, etc. Circuitry to implement media access circuitry 108 may be configured to selectively read from and/or write to memory media 110 in response to corresponding requests (e.g., from processor 102 which may be executing an artificial intelligence related application that may be enabled by execution of MAC operations). As briefly mentioned above, in some examples, controller(s) 106 may include the example VFU 130 which may be implemented as any device or circuitry (e.g., dedicated circuitry, reconfigurable circuitry, ASIC, FPGA, etc.) capable of offloading vector-based tasks from processor 102.

According to some examples, memory media 110 of memory 104 may include non-volatile memory and volatile memory. Non-volatile memory may be implemented as any type of memory media capable of storing data in a persistent manner (e.g., capable of storing data even if power is interrupted). For example, non-volatile memory may be included in one or more non-volatile memory devices. These non-volatile memory devices may include a future generation non-volatile device, such as a three dimensional crosspoint (3DXP) memory device, other byte addressable, nonvolatile memory devices, or memory devices that use chalcogenide phase change material (e.g., chalcogenide glass). In some examples, the non-volatile memory device includes single or multi-level phase change memory (PCM) or phase change memory with a switch (PCMS). The non-volatile memory device may also include a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other type of non-volatile memory. The volatile memory may be implemented as any type of data storage capable of storing data while power is supplied to the volatile memory such as, but not limited to, SRAM or dynamic random access memory (DRAM).

In some examples, as described more below, memory media of memory 104 may include one or more SRAM memory devices to serve as a last level (L3) SRAM cache for processor 102. The SRAM cache may be configured in a bank, sub-bank, and sub-array architecture. For these examples, an application scheduler (not shown) executing on the processor 102 may offload matrix data (e.g., convolutional filter coefficients, input feature maps, etc.) to bit cells included in a given sub-array of the SRAM cache. Compute circuitry integrated and/or coupled with the given sub-array (disclosed more below) may include logic and/or features such as a finite state machine (FSM) to schedule reads from the given sub-array (e.g., data or LUT entries) and to control a compute sequence associated with a CIM or PIM operation. The compute circuitry may also include lightweight (e.g., low area and/or energy consumption) logic and/or features to perform addition for accumulation as part of the CIM or PIM operation.

According to some examples, as shown in FIG. 1, processor 102 and memory 104 may couple with other components of compute device 100 via I/O subsystem 112. I/O subsystem may be implemented as circuitry and/or components to facilitate input/output operations with processor 102 and/or memory 104 and other components of compute device 100. For example, I/O subsystem 112 may be implemented by and/or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate input/output operations. In some examples, I/O subsystem 112 may form a portion of a system-on-a-chip (SoC) or a system-in-a-package (SiP) and may be incorporated, along with one or more of processor 102, memory 104, and other components of compute device 100, in a single chip or package.

In some examples, data storage device 114 may be implemented as any type of device configured for short-term or long-term storage of data such as, for example, memory devices and circuits, memory cards, hard disk drives, solid-state drives, or other data storage device. As shown in FIG.

1, in some examples, data storage device 114 includes controller(s) 116, similar to the controller 106, memory media 120 (also referred to as "storage media"), similar to the memory media 110, and media access circuitry 118, similar to the media access circuitry 108. Further, as described above, controller(s) 116 may also include the example VFU 132 similar to the VFU 130. Data storage device 114 may include a system partition that stores data and/or firmware code for data storage device 114 and/or one or more operating system partitions that store data files and/or executables for operating systems.

According to some examples, communication circuitry 122 may be implemented as any communication circuit, device, or collection thereof, capable of enabling communications over a network between compute device 100 and another device. The example communication circuitry 122 may be configured to use any one of one or more communication technology (e.g., wired or wireless communications) and associated protocols (e.g., Ethernet, Bluetooth®, Wi-Fi®, WiMAX, etc.) to affect such communication.

In some examples, as described above, the illustrative communication circuitry 122 includes NIC 124, which may also be referred to as a host fabric interface (HFI). NIC 124 may be implemented as one or more add-in-boards, daughter cards, network interface cards, controller chips, chipsets, or other devices that may be used by compute device 100 to connect with another compute device. NIC 124 may be embodied as part of an SoC or SiP that includes one or more processors. NIC 124 may include a local processor (not shown) and/or a local memory (not shown) that are both local to NIC 124. In such examples, the local processor of the NIC 124 may perform one or more of the functions of the processor 102. Additionally or alternatively, in such examples, the local memory of NIC 124 may be integrated into one or more components of compute device 100 at the board level, socket level, chip level, and/or other levels.

According to some examples, accelerator device(s) 126 may be embodied as any device(s) or circuitry capable of performing a set of operations faster than processor 102. For example, as described above, accelerator device(s) 126 may include GPU 128 and/or FPGA 129. GPU 128 and/or FPGA 129 may be implemented as any device or circuitry (e.g., a co-processor, an ASIC, reconfigurable circuitry, etc.) capable of performing graphics or compute operations (e.g., matrix operations) faster than processor 102.

Figure 2:
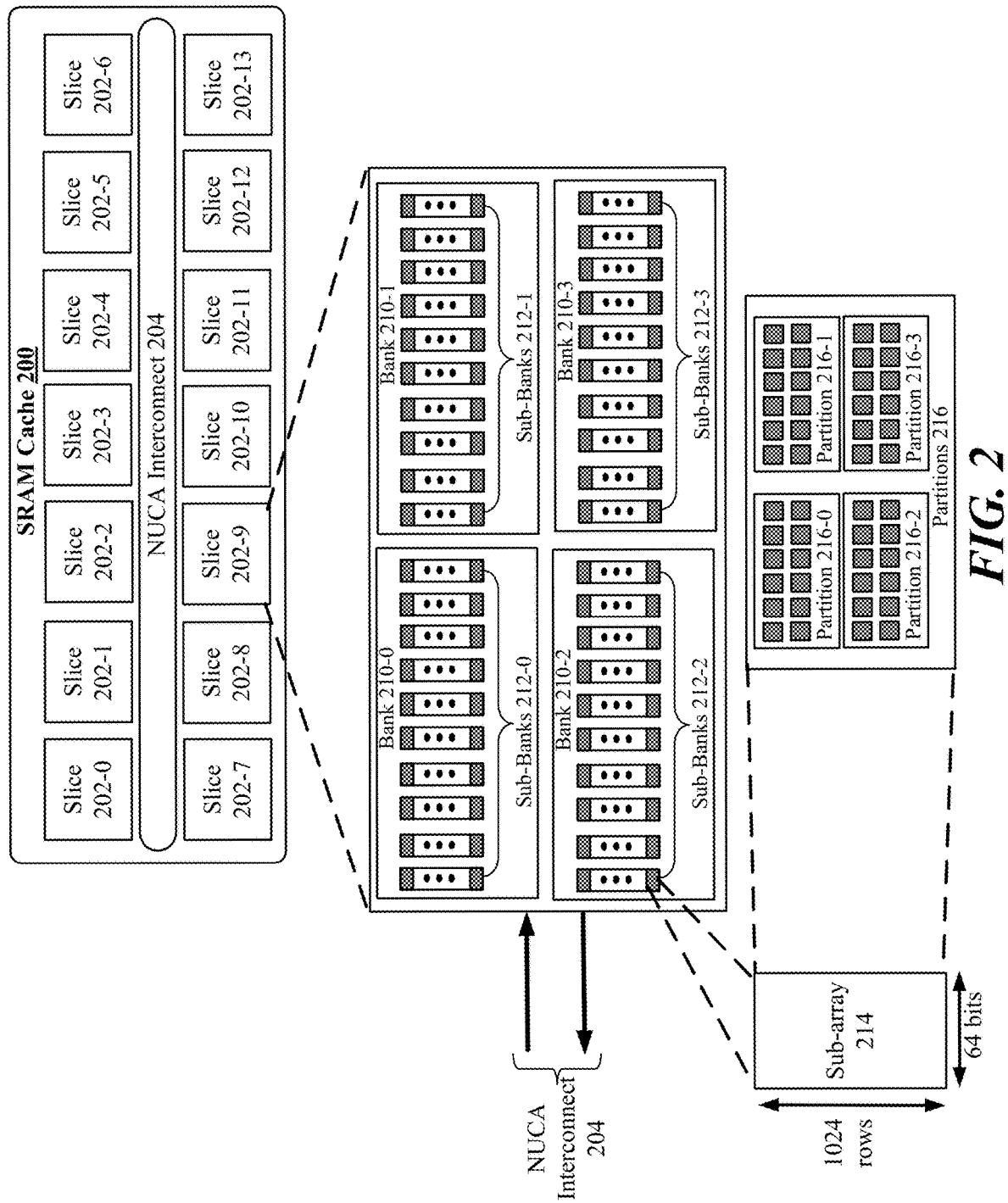
FIG. 2 illustrates an example cache.

FIG. 2 illustrates an example SRAM cache 200. According to some examples, SRAM cache 200 may be included in memory media 110 shown in FIG. 1. SRAM Cache 200 may represent a structure of a last level (L3) cache hierarchy for processor 102. For these examples, processor 102 may include 14 cores (not shown) and each core may have direct access to a corresponding slice from among slices 202-0 to 202-13. Access to individual slices 202-0 to 202-13 for cores not having direct access to a particular individual slice may be established through a ring interconnect such as a non-uniform cache architecture (NUCA) interconnect 204 shown in FIG. 2. Examples are not limited to a NUCA interconnect for establishing a given core's access to multiple slices of SRAM cache 200.

In some examples, as shown in FIG. 2, a slice of SRAM cache 200 such as slice 202-9 may be partitioned into banks 210-0 to 210-3. For these examples, banks 210-0 to 210-3 may be further partitioned into respective sub-banks 212-0 to 212-3. Each sub-bank from among sub-banks 212-0 to 212-3 may include multiple sub-arrays. As shown in FIG. 2, an expanded sub-array 214 from among sub-banks 212-2 is depicted as having 1024 rows that include 64 bits (e.g., 64 SRAM bit cells per row). The 1024 rows that separately include 64 bits gives sub-array 214 a capacity to maintain 8 kilobytes (KB) of data. The 8 KB data capacity, for example, may be based on slice 202-9 having a capacity to maintain 2.5 megabytes (MB) of data, each bank from among banks 210-0 may then have a capacity to maintain 0.625 MB of data, bank 212-2 including 10 sub-banks 212-2 separately having a capacity to maintain around 64 KB of data, and sub-banks 212-2 separately including 8 sub-arrays. Examples are not limited to slice capacities of 2.5 MB, banks capacities of 0.625 MB, sub-banks capacities of 64 KB or sub-arrays capacities of 8 KB. As described more below, sub-array 214 may include partitions 216. As shown in FIG. 2, partitions 216 include four partitions that include partition 216-0, partition 216-1, partition 216-2 and partition 216-3.

Figure 3:
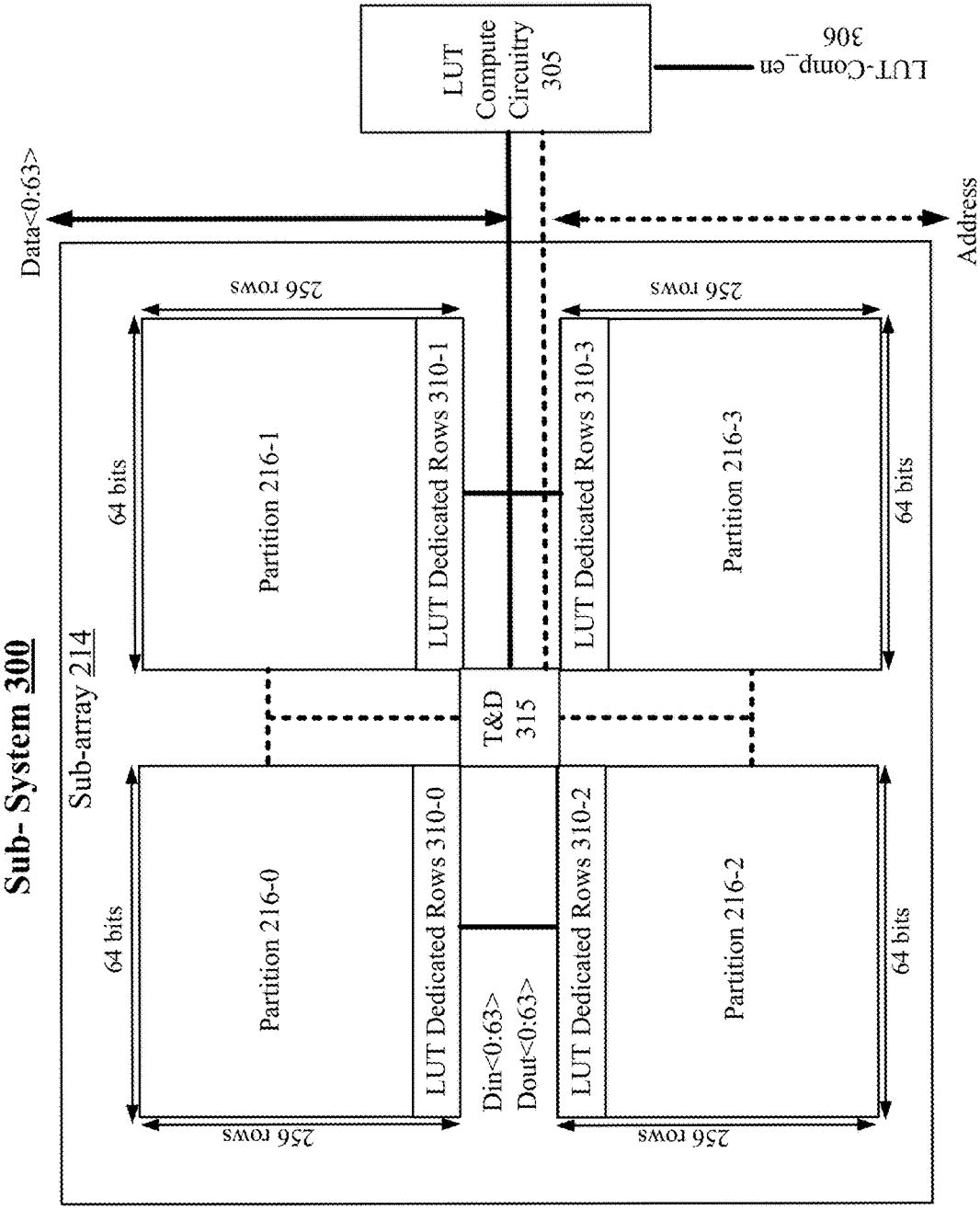
FIG. 3 illustrates an example first sub-system.

FIG. 3 illustrates an example sub-system 300. According to some examples, as shown in FIG. 3, sub-system 300 includes sub-array 214 and partitions 216-0 to 216-3. For these examples, partitions 216-0 to 216-3 share a same timer and decoder (T&D) circuitry 315. T&D circuitry 315 may include one or more decoders, one or more I/O sense amplifiers, and one or more timers to enable read and/or write operations to bit cells included in partitions 216-0 to 216-3. As described in more detail below, memory cell arrays included in each partition may be arranged to include LUT dedicated rows 310-0 to 310-3 that may be enabled and used by a LUT compute circuitry 305 to execute MAC operations. These MAC operations may be executed responsive to a request from controller(s) 106, which may produce the request in response to receiving a corresponding request from processor 102. The request from controller(s) 106, for example, may be indicated and/or conveyed to LUT compute circuitry 305 via an enable signal included in LUT-Comp_en 306.

In some examples, the solid lines coupled between LUT compute circuitry 305 and partitions 216, as shown in FIG. 3, may represent signal paths to write or read from bits cells included in each partition. For these examples, a 64-bit data bus may be used to write to or read from each partition of partitions 216-0 to 216-3 as indicated by Din<0:63> and Dout<0:63>. Read/Write address signals to select what bit cells to read or write data to are indicated by the dashed lines coupled with LUT compute circuitry 305. Physical memory addresses to access bit cells included in each partition may be based on each partition having 64 columns (bitlines) and 256 rows (wordlines).

Figure 4:
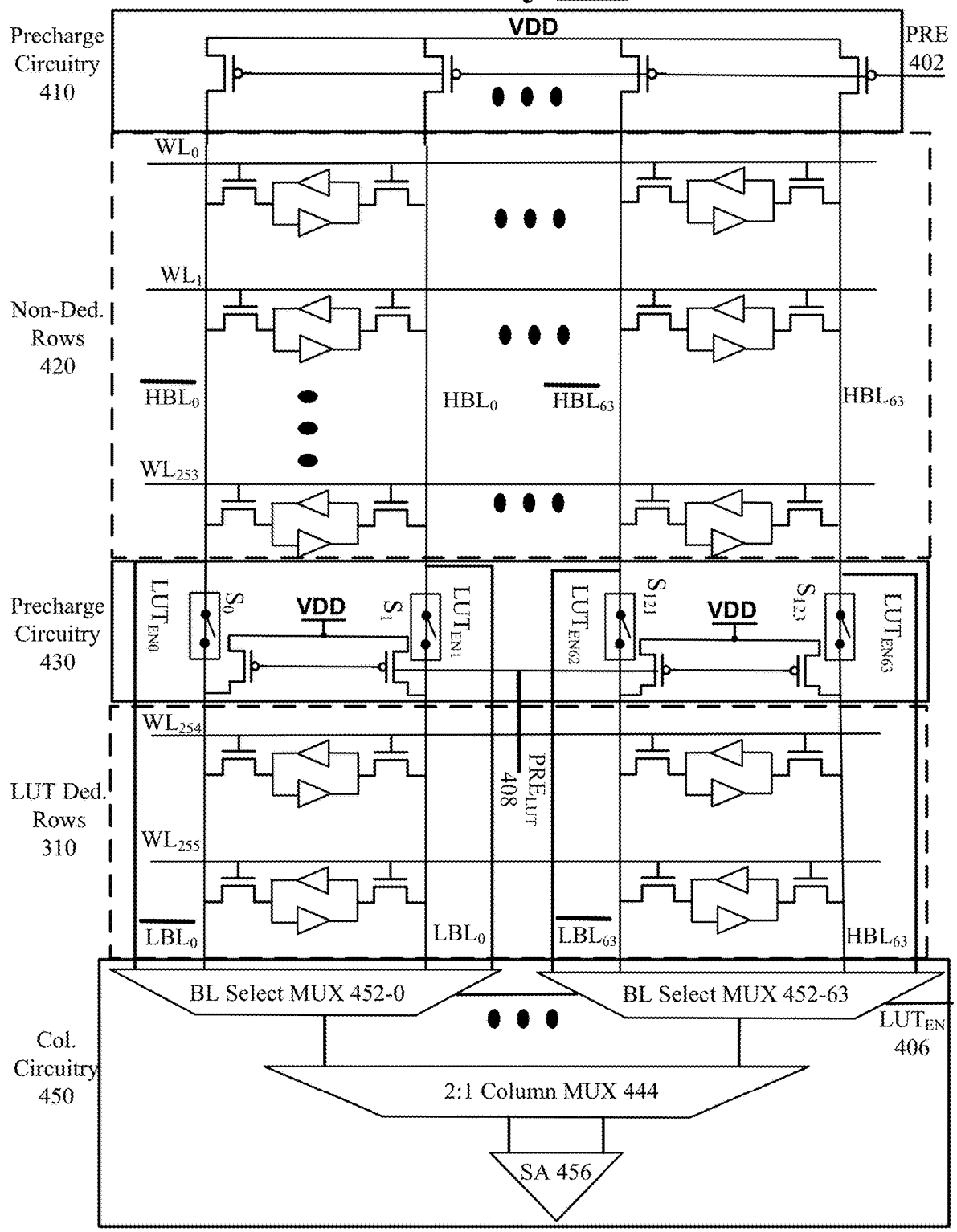
FIG. 4 illustrates an example sub-array partition.

FIG. 4 illustrates an example sub-array 214. Sub-array 214 may be representative of SRAM circuitry included in each partition of partitions 216-0 to 216-3 shown in FIG. 3. According to some examples, as shown in FIG. 4, sub-array 214 includes precharge circuitry 410, non-dedicated rows 420, precharge circuitry 430, LUT dedicated rows 310 and column circuitry 450. For these examples, LUT dedicated rows 310 are arranged to have separate precharge circuitry 430 to activate separate bitlines to enable bit cells included in LUT dedicated rows 310 for storing LUT entries. As described more below, the LUT entries, for example, may be used by logic and/or features of LUT compute circuitry 305 to execute a 4-bit×4-bit matrix multiplication.

In some examples, as shown in FIG. 4, non-dedicated rows 420 include high capacitance bitlines (drain capacitance of 254 access transistors and associated wire parasitic capacitance) $HBL_0$ to $HBL_{63}$ and $\overline{HBL}_0$ to $\overline{HBL}_{63}$ (together referred to as "HBLs") that are separated from low capacitance bitlines (drain capacitance of 2 access transistors and associated wire parasitic capacitance) $LBL_0$ to $LBL_{63}$ and $\overline{LBL}_0$ to $\overline{LBL}_{63}$ (together referred to as "LBLs"). For these examples, access to LUT entries maintained in LUT dedicated rows 310 may be controlled via switches $S_0$ to $S_{123}$ controlled by a LUT enable ($LUT_{En}$) signal such as $LUT_{EN}$ 406.

According to some examples, full access or a normal mode to access bit cells included in a sub-array 214 may include logic and/or features of LUT compute circuitry 305 de-asserting a signal via $LUT_{EN}$ 406 ($LUT_{EN}$=0). For these examples, LBLs and HBLs of sub-array 214 are combined to form a single bitline by shorting these bitlines with switches $S_0$ to $S_{123}$. For this normal mode, a PRE 402 signal is asserted to precharge circuitry 410 to cause a precharging of the combined bitlines LBL/HBL. After wordline assertion and desertion corresponding to selected bit cells, an analog value developed on bitlines LBL/HBL is passed via BL select multiplexers (MUXs) included in BL select MUXs 452-0 to 452-63 to 2:1 column MUXs 444 and then to sense amplifier (SA) 456. SA 456 may then resolve a final digital value outputted from the selected bit cells of sub-array 214.

In some examples, a LUT mode to access bit cells included in LUT dedicated rows 310 may include logic and/or features of LUT compute circuitry 305 asserting a signal via $LUT_{EN}$ 406 ($LUT_{EN}$=1). For these examples, LBLs and HBLs of sub-array 214 operate as two separate bitlines as an $LUT_{En}$=1 for $LUT_{En}$ 406 causes switches $s_1$ to $S_{123}$ to be open and then isolate LBLs from HBLs when LUT accesses are to be made to sub-array 214. Isolation of LBLs from HBLs for the LUT mode may cause significant reduction in energy consumed compared to a normal mode. The reduction primarily attributed to needing to precharge LBLs for only LUT dedicated rows 310. In other words, LBLs for 2 rows in an LUT mode compared to HBLs and LBLs for a total of 256 rows in the normal mode. For this LUT mode, a $PRE_{LUT}$ 408 signal is asserted to precharge circuitry 430 to cause a precharging of only LBLs. After wordline assertion and desertion corresponding to selected bit cells that include targeted LUT entries within LUT dedicated rows 310, an analog value developed on LBLs is passed via BL select MUXs included in BL select MUXs 452-0 to 452-63 to 2:1 column MUXs 444 and then to SA 456. SA 456 may then resolve a final digital value for the target LUT entry outputted from the selected bit cells of sub-array 214.

Figure 5:
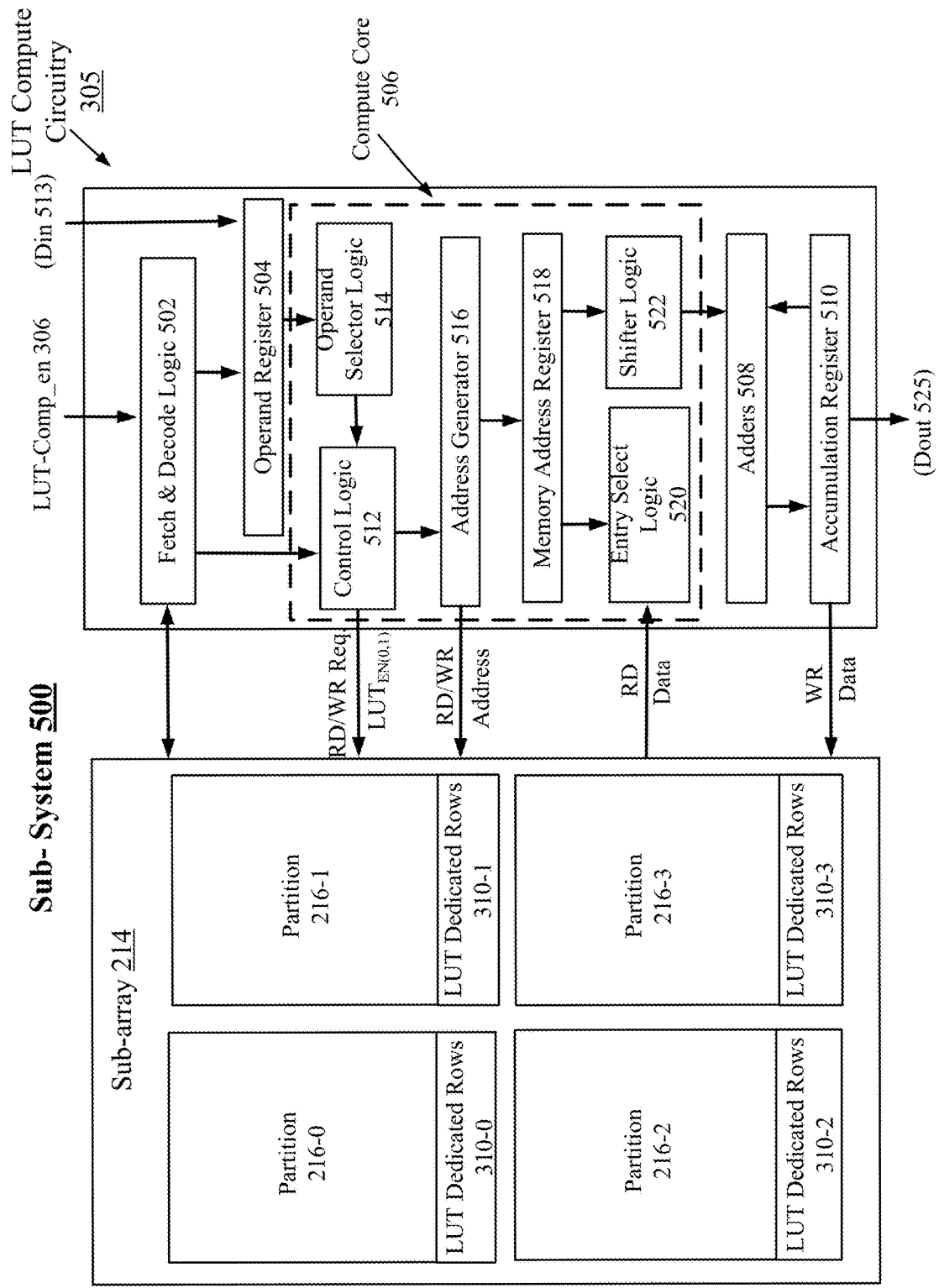
FIG. 5 illustrates an example second sub-system.

FIG. 5 illustrates an example sub-system 500. In some examples, as shown in FIG. 5, sub-system 500 includes LUT compute circuitry 305 coupled with sub-array 214. For these examples, LUT compute circuitry 305 is reconfigurable and can support a large spectrum of machine learning model inference workloads (e.g., DNN workloads, convolutional neural network (CNN) workloads, recurrent neural network (RNN) workloads, transformer model workloads, etc.) which perform different operations such as MAC operations, normalization, element-wise scaler arithmetic, and many non-linear functions. MAC operations are prevalent in many machine learning model inference workloads (e.g., DNN inference workloads). As briefly mentioned above, LUT entries for LUT compute circuitry 305 to execute MAC operations may be maintained in LUT dedicated rows 310-0 to 310-3 of sub-array 214.

According to some examples, LUT compute circuitry 305 may be capable of supporting 4-bit, 8-bit, and 16-bit integer operations. For example, LUT compute circuitry 305 performs integer-to-integer multiplication with a LUT-based approach. Advantageously, LUT compute circuitry 305 reduces (e.g., minimizes) LUT storage costs (e.g., number of dedicated rows for entry storage) using a 4-bit multiplication capability that is described more below. LUT compute circuitry 305, for example, may handle higher bit multiplication via a shift and add approach. Also, LUT compute circuitry 305 may be capable of performing dot-product accumulation via logical adders.

As shown in FIG. 5, LUT compute circuitry 305 is in circuit or coupled with sub-array 214. In some examples, LUT compute circuitry 305 may receive a request to perform a MAC operation from media access circuitry 108 by LUT compute circuitry 305 receiving an enable signal via LUT-Comp_en 306. In the example of FIG. 5, LUT compute circuitry 305 includes a fetch and decode (FAD) logic 502, an operand register 504, a compute core 506, adders 508, and an accumulation register 510. As shown in FIG. 5, compute core 506 may include control logic 512, operand selector logic 514, an address generator 516, a memory address register 518, an entry select logic 520, and a shifter logic 522.

According to some examples, control logic 512 of LUT compute circuitry 305 may transmit read and/or write requests (Rd/Wr Req) to the sub-array 214. A $LUT_{EN}$ signal may also be transmitted with and/or substantially concurrent to the read and/or write requests to indicate whether sub-array 214 is to be accessed in a normal mode ($LUT_{EN}$=0) or accessed in a LUT mode ($LUT_{EN}$=1) as described above in FIG. 4. Additionally, address generator 516 transmits a corresponding read and/or write address (Rd/Wr Addr) to sub-array 214. For write requests, LUT compute circuitry 305 also transmits write data (Wr Data) to sub-array 214 via accumulation register 510. In response to a read request, sub-array 214 generates read data (Rd Data) and transmits the read data to entry select logic 520.

In some examples, as shown in FIG. 5, FAD logic 502 is coupled with operand register 504, control logic 512 and sub-array 214 to fetch and decode instructions to perform operations in response to one or more requests from the media access circuitry 108 indicated via LUT-Comp_en 306. For these examples, as shown in FIG. 5, operand register 504 is coupled with the FAD logic 502 and operand selector logic 514. Control logic 512 is coupled with FAD logic 502, operands selector logic 514, address generator 516, and sub-array 214. Operand selector logic 514 is coupled with operand register 504 and control logic 512. Address generator 516 is coupled with control logic 512, memory address register 518, and sub-array 214. Memory address register 518 is coupled with address generator 516, entry select logic 520, shifter logic 522. Entry select logic 520 is coupled with sub-array 214, memory address register 518, and shifter logic 522. Shifter logic 522 is coupled with memory address register 518, entry select logic 520, and adders 508. Adders 508 are coupled with shifter logic 522 and accumulation register 510. Accumulation register 510 is coupled with sub-array 214, adders 508, and to media access circuitry 108 via output 525. Although components of FIG. 5 are illustrated in circuit or coupled with other components using a single line, inter-component coupling may be implemented using multiple connection lines to accommodate parallel, multi-bit values and/or multiple control signal lines. Additionally, while some components are shown directly connected to other components in in some examples there may be other components and/or circuitry connected between such components. Also, while not illustrated in FIG. 5, additional connections between various components of LUT compute circuitry 305 and/or sub-array 214 may exist.

According to some examples, FAD logic 502 may be implemented by a program counter, a memory data register, and/or an instruction register (not shown). In example operations to fetch and decode instructions, FAD logic 502 may transmit a value generated by the program counter to control logic 512. The generated value may specify an address within sub-array 214 from which LUT compute circuitry 305 is to read an instruction. The instruction, for example, may be referred to as a "configuration block". As described more below, a configuration block may store metadata to indicate a bit-precision, a type of operation (e.g., MAC operation), number of iterations for the operation, and starting and ending address for data used as inputs for a computation performed for the operation (e.g., operands stored to sub-array 214). Control logic 512 may forward the generated value to address generator 516 and transmit a read request to sub-array 214 in order to access the instructions or configuration block from sub-array 214 according to the generated value. For these examples, the instructions or configuration block are stored in LUT dedicated rows of sub-array 214 (e.g., LUT dedicated rows 310 of sub-array partition 216). Hence, control logic 512 asserts an $LUT_{EN}$ signal ($LUT_{EN}$=1) transmitted with the read request to sub-array 214. Address generator 516 may transmit the address from which to read the instruction in sub-array 214 as specified by the generated value.

In an example operation to fetch and decode instructions, in response to receiving a read request from control logic 512 and a corresponding address from the address generator 516, sub-array 214 returns metadata included in a configuration block that was stored in the memory location specified by the address generator 516. For example, sub-array 214 transmits the metadata stored in the memory location to the FAD logic 502. FAD logic 502 stores the metadata received from the sub-array in its memory data register. As such, FAD logic 302 copies the metadata in the configuration block to its instruction register.

In an example operation to fetch and decode instructions, as mentioned above, the metadata in the configuration block retrieved from sub-array 214 indicates a type of operation, operating parameters and starting and ending addresses for data used as inputs for a computation performed for the operation. In some examples, the data specified for use as inputs for the computation is referred to as an "operand" and the portion of the metadata that indicates a type of operation, bit-precision, and number of iterations for the operation is referred to as an "opcode". In examples disclosed herein, operands may be retrieved in groups of elements where each element corresponds to four bits. After FAD logic 502 copies the operand to its instruction register, FAD logic 502 transmits the opcode to the control logic 512. FAD logic 502 also transmits the operand to the operand register 504. Control logic 512 decodes the opcode to determine the operation (e.g., load, add, store, MAC, etc.) to perform on the data included in the operand.

According to some examples, operand register 504 stores one or more operands on which LUT compute circuitry 305 is to operate. For these examples, operand select logic 514 selects the operand corresponding to the opcode, that the control logic 512 receives from the FAD logic 502 and transmits the selected operand to the control logic 512. In the example of FIG. 3, LUT compute circuitry 305 may use a 4-bit, an 8-bit, and/or a 16-bit operand for MAC operations (examples not limited to 4-bit, 8-bit or 16-bit operands).

In example processing of operands, control logic 512 forwards the operand corresponding to the opcode to the address generator 516. Based on the opcode, control logic 512 transmits a read or write request to sub-array 214. For example, if the opcode corresponds to a load operation to load LUT entries for a MAC operation, then control logic 512 transmits a read request to sub-array 214 to access LUT entries maintained in LUT dedicated rows 310-0. For this example, control logic 512 asserts an $LUT_{EN}$ signal ($LUT_{EN}$=1) transmitted with the read request to sub-array 214 to cause sub-array 214 to open switches $S_0$ to $S_{123}$ in order to isolate LBLs on a particular partition associated with the address for the read request and also cause a $PRE_{LUT}$ signal to be asserted to precharge the isolated LBLs using the dedicated precharge circuitry (e.g., precharge circuitry 430 shown in FIG. 4). Address generator 516 transmits the starting and ending address for the operand (e.g., starting and ending address corresponding to the data on which to be operated) indicated in the configuration block to sub-array 214. Address generator 516 also loads the memory address register 518 with the operand.

In example processing of operands, based on the selected operand received from address generator 516, sub-array 214 transmits the data stored at the address of the operand to entry select logic 520. Entry select logic 520 forwards the data stored at the address of the operand to shifter logic 522. For these examples, based on the operand, shifter logic 522 either (1) shifts the data stored at the address of the operand and forwards the data to adders 508 or (2) forwards the data stored at the address of the operand to the adders 508. Adders 508 may then add the data corresponding to the operand to the data stored in accumulation register 510 and stores the sum in accumulation register 510. In some examples, accumulation register 510 stores the sum in the sub-array 214.

In additional or alternative examples, accumulation register 510 sum(s) may be sent to adjacent sub-arrays of a sub-bank via Dout 525 as part of a systolic dataflow (described more below) if sub-array 214 is not a last sub-array of the sub-bank. If sub-array 214 is a last sub-array of the sub-bank, Dout 525 may be sent to media access circuitry 108. Also, as part of the systolic dataflow, Din 513 may receive partial sum(s) or results from adjacent sub-arrays of the sub-bank or sub-arrays included in an adjacent sub-bank (described more below). As shown in FIG. 5, Din 513 couples with operand register 504 to enable LUT compute circuitry 305 to at least temporarily store partial sum(s) or results that may be subsequently used by logic and/or features of LUT compute circuitry 305 for the MAC operation.

The above described architecture of LUT compute circuitry 305, as described above for FIG. 5, may be considered a bitline computation free PIM architecture that is capable of computing various complex neural network primitives at a sub-array granularity. This bitline computation free PIM architecture is an alternative to bitline computing as it does not make use of multi row activation and repetitive bitline accesses while performing or executing somewhat complex CIM or PIM operations like MAC operations, division operations, square root operations, exponent operations, sigmoid operations, tan h operations, softmax operations, etc.

FIG. 6 illustrates an example configuration block 600. In some examples, as shown in FIG. 6, configuration block 600 includes a start address 610, an end address 620, an operation 630, an iteration 640 and a bit-precision 650. As briefly mentioned above, a configuration block such as example configuration block 600 may be a type of instruction that when decoded includes metadata related to a compute operation to be executed by logic and/or features of LUT compute circuitry 305. Also as mentioned above, metadata included in configuration block 600 may be stored to a sub-array such as sub-array 214 in LUT dedicated rows of the sub-array such as LUT dedicated rows 310 of sub-array partition 216.

According to some examples, start address 610 and end address 620 may indicate respective starting and ending addresses within sub-array 214 for an operand to be input in an operation indicated in operation 630. Iteration 640, for example, may indicate a number of iterations for the logic and/or features of LUT compute circuitry 305 to execute the operation indicated in operation 630. Bit-precision 650, for example may indicate a bit-precision for computation results computed based on LUT entries maintained in LUT dedicated rows of sub-array 214. For example, a 4-bit×4-bit multiplication for a MAC operation may have an 8-bit bit-precision.

Figure 7:
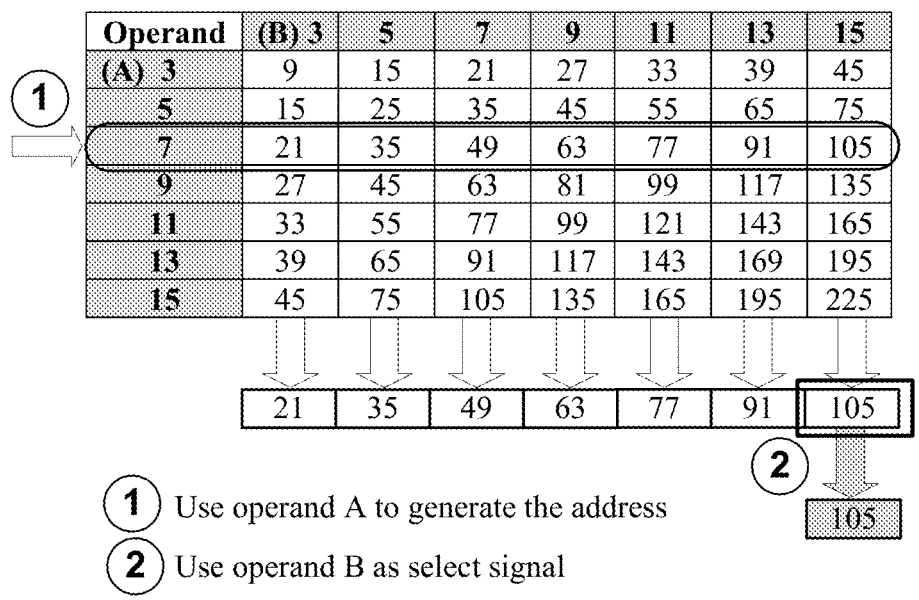
FIG. 7 illustrates an example LUT entry table.

FIG. 7 illustrates an example LUT entry table 700. According to some examples, as shown in FIG. 7, LUT entry table 700 includes 7 odd valued, 4-bit operands and associated multiplication results from multiplying the 7 odd, 4-bit operands. The multiplication results depicted in LUT entry table 700 range from 3 to 225. A value of 225 may be represented by an 8-bit value. For these examples, a LUT supporting 4-bit operands requires a maximum number of 256 LUT entries ($2^8$=256). However, a reduced number of 8-bit values for the 49 LUT entries for the 7 odd, 4-bit operand multiplication results shown in FIG. 7 for LUT entry table 700 may be possible utilizing fundamental multiplication properties associated with LUT multiplication tables. A reduced number of LUT entries minimizes a number of LUT dedicated rows included in a sub-array such as sub-array 214. For example, sub-array partition 216 shown in FIG. 4 includes 2 LUT dedicated rows. A single sub-array partition 216 may be able to store 128b/8 or 16 8-bit LUT entries. Since sub-array 214 is described above as including 4 partitions, each partition having 2 LUT dedicated rows as shown in FIG. 4, a total of 16×4=64 8-bit LUT entries are possible. Since only 49 8-bit LUT entries are needed for the 7 odd, 4-bit operand multiplication results, there is a remaining 15×8-bits=120b of available dedicated LUT row storage capacity. In some examples, at least a portion of this available dedicated LUT row storage capacity may be used to store metadata for a configuration block such as metadata included in example configuration block 600.

In some examples, as shown in FIG. 7, LUT compute circuitry coupled with a sub-array such as LUT compute circuitry 305 coupled with sub-array 214 may use operand A to generate an address to access a LUT entry (e.g., select a wordline of a row) and use operand B as a select signal (e.g., LBLs corresponding to an 8-bit LUT entry) for a read request to sub-array 214. For example, LUT entry table 700 depicts operand A as being 7 and operand B as being 15. For this example, an operand of 7 may indicate which row or wordline includes LUT entries having multiples of 7 and an operand of 15 may indicate which LBLs are to be selected to retrieve an LUT entry from sub-array 214 corresponding to 7×15=105 for sub-array 214 to fulfill LUT compute circuitry 305's read request.

According to some examples, given that only odd operands and products are included in LUT entry table 700, if either operand for a MAC operation are powers of two, logic and/or features of LUT compute circuitry 305 (e.g., shifter logic 522) may shift the other operand before adding it to a partial result. For example, multiplication can be done by left shifting a first operand's value by a value of a second operand having a value that is a power of two before adding it to the partial result. If the operands are both odd numbers (except for an operand=1), the logic and/or features of LUT compute circuitry 305 directly fetches its products from LUT entry table 700 having LUT entries stored in sub-array 214 as described above. If both operands are even but non-powers of 2, then logic and/or features of LUT compute circuitry 305 may decompose the operands into multiples of an odd number and powers of 2, and appropriately shift a partial product based on the odd number products fetched from LUT entry table 700 before adding it to a partial result. For example, if the operand has a value of 6 (an even number but not a power of two), then the value of 6 may be decomposed into 5+1. The logic and/or features of LUT compute circuitry 305 may then access LUT entries for multiplications with 5 and does not need to compute for 1. The logic and/or features of LUT compute circuitry 305 may then add these two partial results to appropriately shift the partial product. For the above examples, decisions for decomposing operands may be made by control logic 512 of LUT compute circuitry 305. Hence, decomposing the MAC operation between LUT entry table 700 and control logic 512 results in a need for fewer LUT entries. In some examples, LUT entries may be further reduced by half, by storing only upper or lower triangle entries but this may lead to reduced parallelism for CIM or PIM operations.

Figure 8:
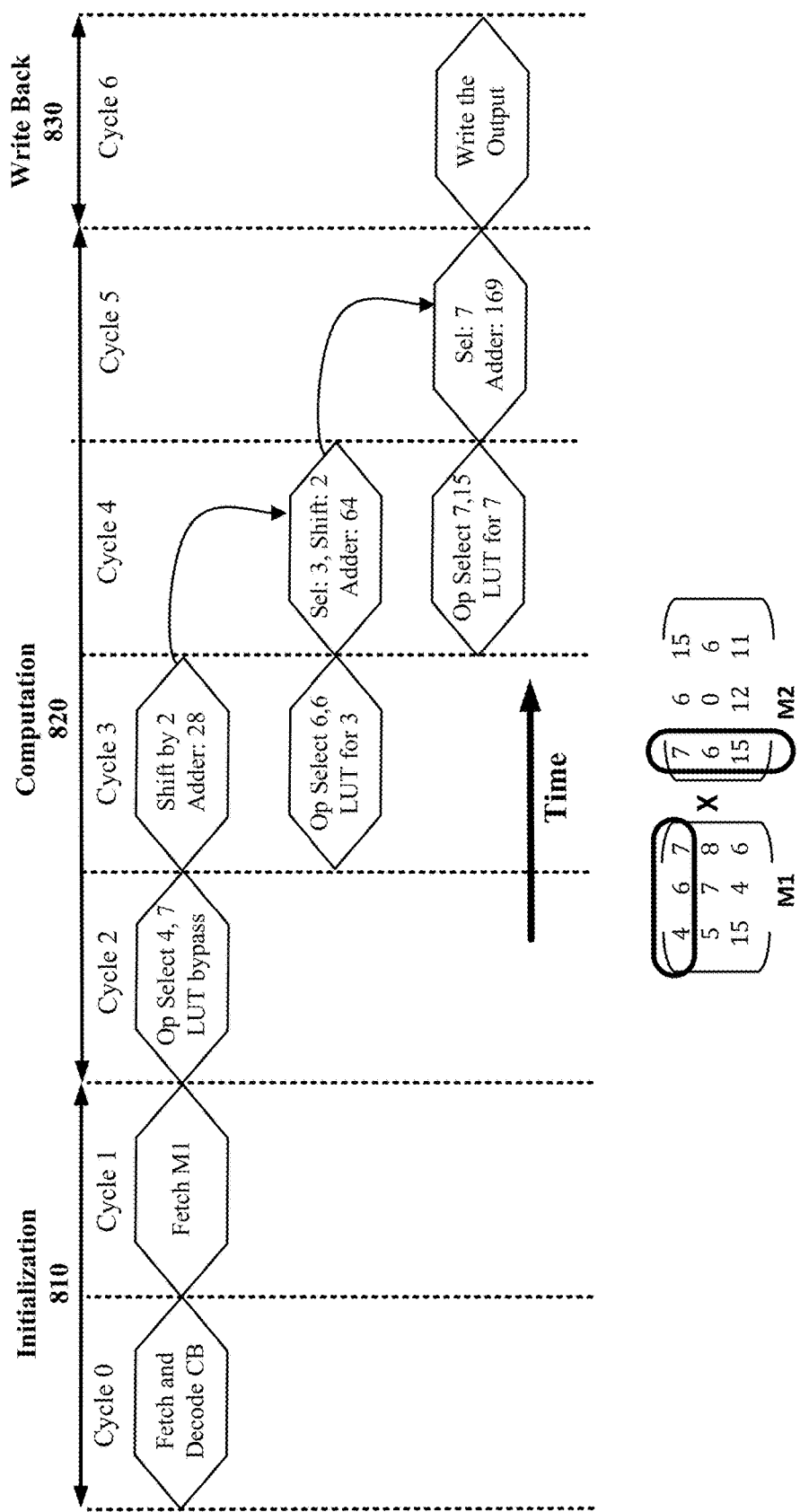
FIG. 8 illustrates an example execution pipeline.

FIG. 8 illustrates an example execution pipeline 800. In some examples, execution pipeline 800 shows execution steps for an example matrix multiplication operation with 4-bit operands. For these examples, logic and/or features of LUT compute circuitry 305 coupled with sub-array 214 as shown in FIG. 5 may implement execution pipeline 800. Although examples are not limited to the logic and/or features of LUT compute circuitry 305 coupled as described above and shown in FIG. 5.

In some examples, as shown in FIG. 8, execution pipeline includes three phases shown as initialization 810, computation 820 and write back 830. For these examples, as part of initialization 810 and cycle 0, responsive to a LUT-Comp_en 306 enable signal, logic and/or features of LUT compute circuitry 305 (e.g., FAD logic 502) may read contents of a control block retrieved from LUT dedicated rows 310 of sub-array 214 and decode an address of a first row of matrix M1 along with matrix dimensions. In cycle 1, a first column of M2 may be input streamed (input stream described more below) from an external bus coupled with LUT compute circuitry 305 and the first row of matrix M1 is retrieved or read from sub-array 214 using address information indicated in the control block (e.g., as indicated in start address 610 and end address 620 of configuration block 600). In cycles 2-4 of computation 820, logic and/or features of LUT compute circuitry 305 performs three multiplication and two addition operations to generate a first element of an output matrix. Since M1 data ("4" shown in FIG. 8) is a value having a power of two, the logic and/or features of LUT compute circuitry 305 does not access LUT entries maintained in LUT dedicated rows 310 of sub-array 214 in cycle 3. Rather, the logic and/or features of LUT compute circuitry 305 perform left shifting for multiplication. In cycle 4, logic and/or features of LUT compute circuitry 305 performs a two left shift operation because the even numbered input/operand for this cycle 4 is split into 2 powers of two numbers. At cycle 5, LUT entries maintained in LUT dedicated rows 310 of sub-array 214 may then be accessed since both inputs/operands are odd numbers. At write back 830 and cycle 6, an output is written back. Execution pipeline 800 may continue until an end of a complete matrix multiplication for M1 and M2. Since initialization 810 is performed only once during the beginning (cycles 0 and 1), computation cycles or iterations are proportional to a number of multiplications with a small overhead of reading operands from sub-array 214. Even for higher bit-width operands (e.g., 8-bit, 16-bit), logic and/or features of LUT compute circuitry 305 may decompose these higher bit-width operands into 4-bit operands for the multiplication operation and accumulate partials in a similar pipelined manner.

Figure 9:
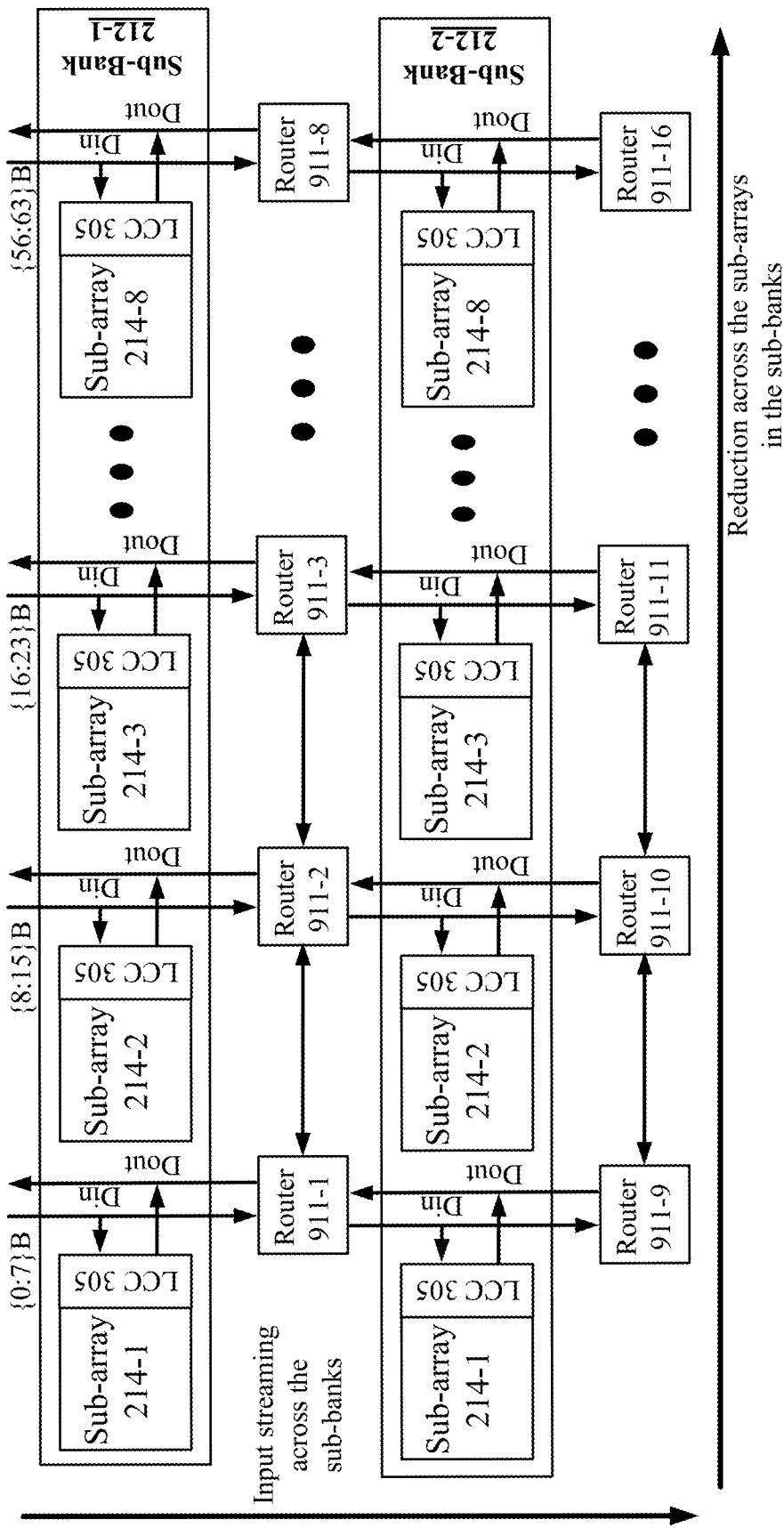
FIG. 9 illustrates an example bank portion.

FIG. 9 illustrates an example bank portion 900. According to some examples, bank portion 900 may be part of bank 210 of slice 202-9 included in SRAM cache 200 as described above and shown in FIG. 2. Also, sub-banks 212-1 and 212-2 each including 8 sub-arrays may represent an example portion of the four sub-banks shown in FIG. 2 for bank 210. For these examples, routers 911-1 to 911-16 may augment a conventional cache sub-array level interconnect that consists of data-in, data-out, and address bus from a port to every LUT compute circuitry (LCC) 305 coupled with a sub-array 214 (e.g., Din 515/Dout 525 shown in FIG. 5). In examples where data is arranged to be stripped across a sub-bank, for any memory access, all sub-arrays in a particular sub-bank (determined by address) will be activated. For example, FIG. 9 shows Din/Dout for data bits {0:7} to {56:63} stripped across sub-arrays included in both sub-banks 212-1 and 212-2.

In some examples, the augmentation of the conventional cache sub-array level interconnect in conjunction with separate LUT compute circuitry 305s coupled with each sub-array supports data connectivity between sub-arrays in a same column of bank portion 900 via routers 911-1 to 911-6, for example, sub-array 214-1 of sub-bank 212-1 shares connectivity to sub-array 214-1 of sub-bank 212-2 via router 911-1. For these examples, routers 911-1 to 911-16 may also be used to provide connectivity between sub-arrays in a same sub-bank as indicated by the bidirectional, horizontal arrows between routers 911 shown in FIG. 9. Interconnects for Din and Dout are shown in FIG. 9 as unidirectional. Unidirectional interconnects for Din and Dout indicate that a given router from among routers 911-1 to 911-16 connects data-in of a sub-array to data-out of a neighboring sub-array. This type of unidirectional interconnection allows for a systolic dataflow within slice 202-9. In some examples, data during a systolic operation may be stored with registers of respective LUT compute circuitry 305s (e.g., operand register 504) to allow seamless dataflow. Also, in some examples, reduction of partial products may be across sub-arrays local to a given sub-bank, whereas input streaming may be across sub-banks. A systolic data movement within a slice such as slice 202-9 may be uniform at a given time and may be managed by logic and/or features of respective LUT compute circuitry 305s in conjunction with other controllers associated with slice 202-9 or SRAM cache 200.

Figure 10:
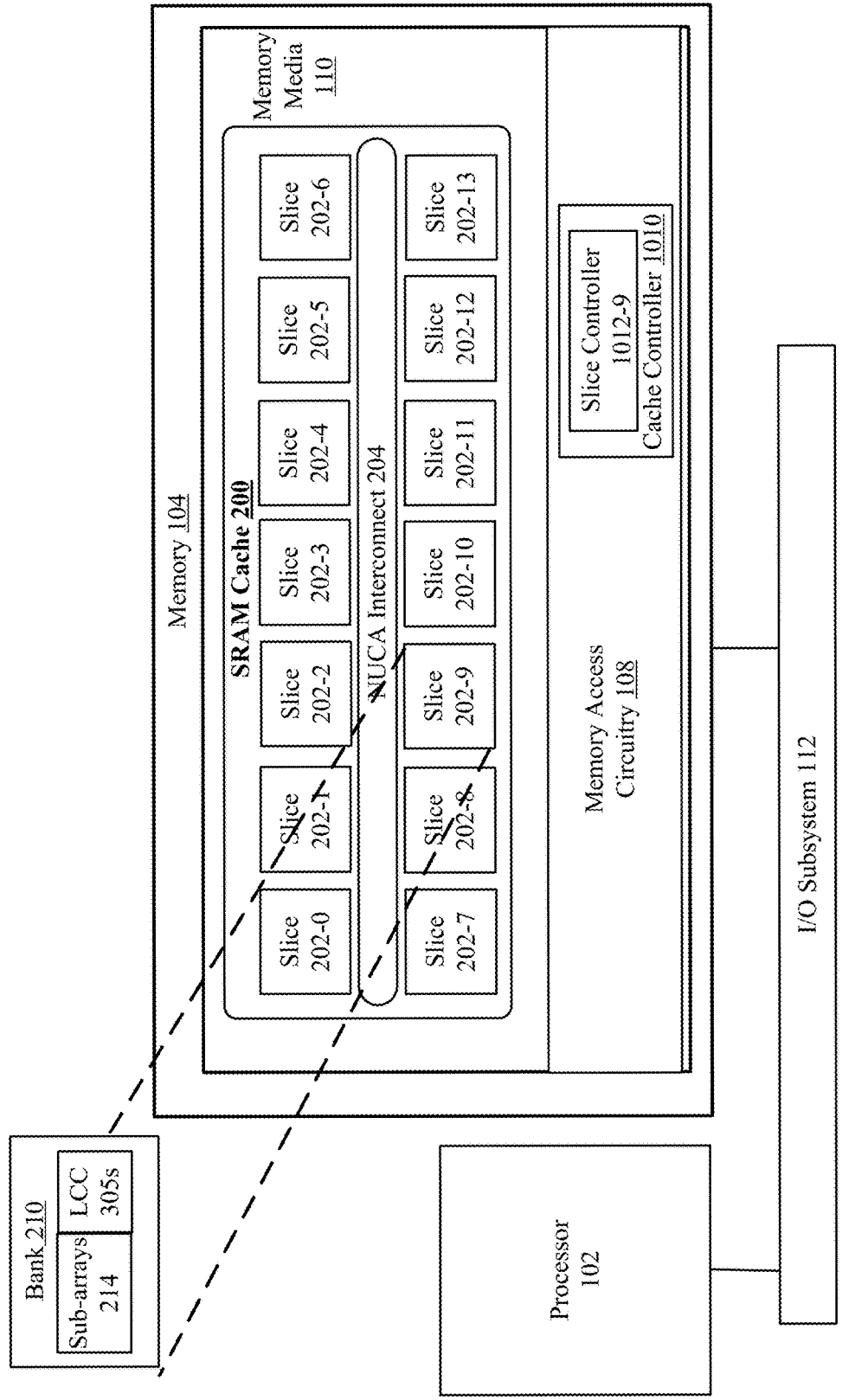
FIG. 10 illustrates an example third sub-system.

FIG. 10 illustrates an example sub-system 1000. In some examples, sub-system 1000 may represent a sub-system of compute device 100 shown in FIG. 1. For these examples, as shown in FIG. 10, processor 102 is coupled with memory 104 via I/O subsystem 112. Also as shown in FIG. 10, memory media 110 of memory 104 includes SRAM cache 200. As mentioned above for FIG. 2, SRAM cache 200 may be arranged as a last level (L3) cache for processor 102.

According to some examples, as shown in FIG. 10, media access circuitry 108 includes a cache controller 1010. For these examples, cache controller 1010 may also include separate circuitry and/or programmable logic to separately control a respective slice. For example, as shown in FIG. 10, cache controller 1010 may have a slice controller 1012-9 to control slice 202-9. Cache controller 1010 may include circuitry to program slice controller 1012-9 as part of a hierarchical control mechanism across SRAM cache 200, to slice 202-9, to bank 210 and to sub-array 214 granularity for execution of DNN workloads that utilize LUT compute circuitry 305s for CIM or PIM operations (e.g., convolution, matrix multiplication, pooling, and activation functions). In order to utilize LUT compute circuitry 305s for CIM or PIM operations, instructions associated with a kernel for a DNN workload are initially directed to cache controller 1010. Cache controller 1010 may include logic and/or features to execute the kernel. The instructions, for example, may cause a layer by layer execution of DNN workloads.

Figure 11:
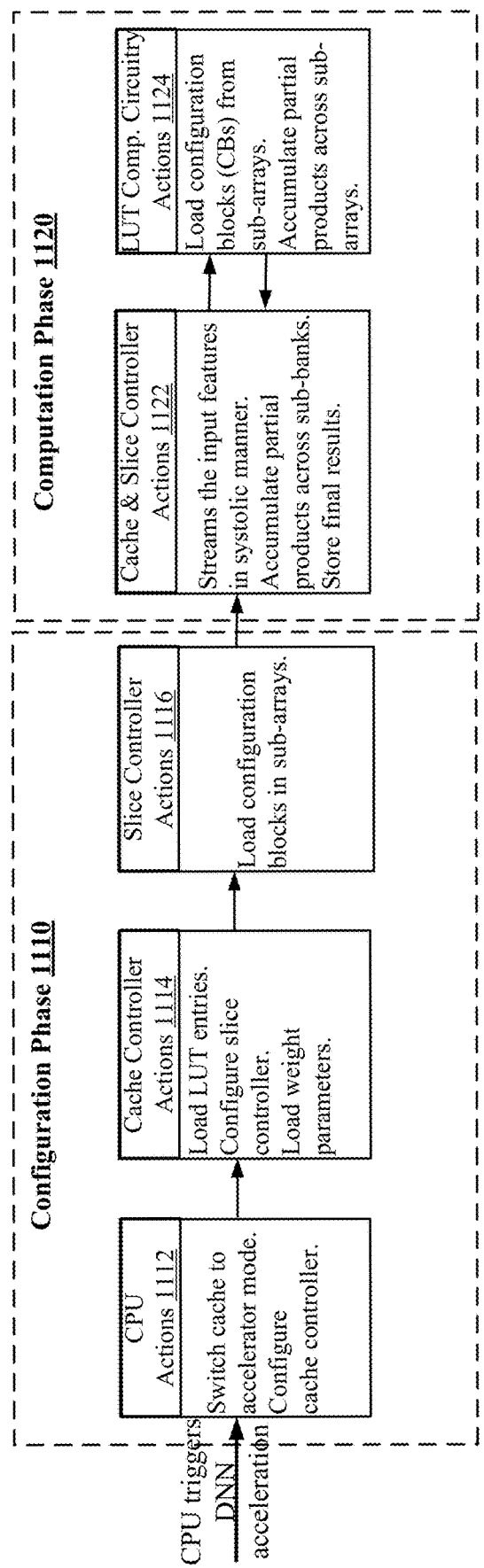
FIG. 11 illustrates an example scheme.

FIG. 11 illustrates an example scheme 1100. In some examples, as shown in FIG. 11, scheme 1100 include a configuration phase 1110 and a computation phase 1120. For these examples, elements of sub-system 1000 described above for FIG. 10 may implement at least portions of scheme 1100. For example, processor 102 (serving as a CPU), SRAM cache 200 that includes cache controller 1010, slice controller 1112-9, slice 202-9, bank 210, sub-array 214, or LUT compute circuitry 305s may implement at least portions of scheme 1100. Examples are not limited to these elements implementing scheme 1100. For example, other slice controllers and slices may also implement at least portions of scheme 1100.

According to some examples, configuration phase 1110 may be triggered responsive to a CPU (processor 102) triggering a DNN acceleration. As part of configuration phase 1110, CPU actions 1112 include processor 102 causing SRAM cache 200 to switch to an accelerator mode. CPU actions 1112 may also include processor 102 configuring cache controller 1010 to coordinate the DNN acceleration. Configuring cache controller 1010 to coordinate the DNN acceleration may include processor 102 providing instructions associated with a kernel for executing a DNN workload using circuitry included in SRAM cache 200 that is capable of PIM or CIM operations.

In some examples, also as part of configuration phase 1110, cache controller actions 1114 include cache controller 1010 causing LUT entries to be loaded to SRAM cache 200. As mentioned above, LUT entries may be maintained in LUT dedicated rows of each sub-array included in SRAM cache 200. For example, LUT dedicated rows 310 of sub-array 214. The LUT entries, for example, may include multiplication results for odd operands as shown in FIG. 7. Cache controller actions 1114 may also include cache controller 1010 to load any applicable weight parameters to sub-arrays included in each slice of SRAM cache 200. The weight parameters, for example, may be loaded to non-dedicated rows 420 of sub-array 214 and may be associated with the DNN workload to be executed using the circuitry included in SRAM cache 200. In some examples, the weight parameters may be loaded in a broadcast fashion across all the slices of SRAM cache 200. Depending on kernel parameters for executing the DNN workload (e.g., dimensions of filter, number of channels, etc.), weight parameters may be distributed across and within each slice for efficient DNN workload execution. Cache controller 1010 may employ weight duplication, and efficient partition across sub-arrays to increase parallelism for executing the DNN workload.

According to some example, also as part of configuration phase 1110, slice controller actions 1116 include loading configuration blocks in sub-arrays. For example, slice controller 1112-9 may cause configuration blocks to be loaded to a portion of LUT dedicated rows 310 of sub-array 214 that does not include the LUT entries previously loaded by cache controller 1010.

In some examples, computation phase 1120 includes cache and slice controller actions 1122. For these examples, cache controller 1010 causes input features/operands to be loaded onto input or operand registers (e.g., operand register 504) of each LUT compute circuitry 305 coupled with a sub-array of a first sub-bank using respective slice controllers. For example, using slice controller 1112-9 to load operand registers to LUT compute circuitry 305 coupled with sub-array 214-1 of sub-bank 212-1 (shown in FIG. 9). As mentioned above for FIG. 9, operands or inputs may be fed to adjacent sub-banks in a systolic manner in subsequent cycles.

According to some examples, computation phase 1120 also include LUT compute circuitry actions 1124. For these examples, logic and/or features of each LUT compute circuitry 305 coupled with sub-arrays included in SRAM cache 200 such as control logic 512 may cause respective configuration blocks to be read or loaded from LUT dedicated rows that were loaded as mentioned above for slice controller actions 1116. The reading of configuration blocks, for example, may be responsive to LUT compute circuitry 305 receiving an LUT-Comp_en 306 enable signal from slice controller 1112-9. This enable signal may cause control logic 512 to assert $LUT_{EN}$ 406 to open switches S0 to $S_{123}$ of sub-array 214-1 and activate precharge circuitry 430 for LUT dedicated rows 310. The logic and/or features of LUT compute circuitry 305 such as FAD logic 502 may decode loaded configuration blocks for logic and/or features of LUT compute circuitry 305 to perform a corresponding PIM or CIM operation associated with the DNN workload (e.g., multiplication) using LUT entries loaded to LUT dedicated rows as mentioned above for cache controller actions 1114.

In some examples, LUT compute circuitry actions 1124 also includes logic and/or features of LUT compute circuitry 305 to accumulate partial products from adjacent sub-arrays in a systolic fashion. For these examples, a final product may be accumulated in a last sub-array in each sub-bank. Cache and slice controller actions 1122 may also include slice controllers, depending on the PIM or CIM operation associated with the DNN workload, causing accumulated products to be further distributed across different sub-arrays in a same sub-bank depending on an output channel for the accumulated products.

According to some examples, cache and slice controller actions 1122 may also include storing final results for the PIM or CIM operation associated with the DNN workload. The final results may be stored in sub-arrays of SRAM cache 200 for processing a next layer feature. Alternatively, the final results may be stored to a next level of storage (e.g., DRAM system memory). The next level of storage may be utilized based on the DNN workload being associated with batch inference, where output features may be stored to the next level of storage due to SRAM cache 200 storage space constraints.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A memory device comprising:
a plurality of static random access memory (SRAM) sub-arrays; and
a plurality of compute circuitry, individual compute circuitry from among the plurality of compute circuitry arranged to access data maintained in a corresponding SRAM sub-array from among the plurality of SRAM sub-arrays to enable the individual compute circuitry to execute a multiply and accumulate (MAC) operation, the plurality of SRAM sub-arrays to each include:
a first precharge circuitry to precharge bitlines coupled with all bit cell rows; and
a second precharge circuitry to precharge bitlines coupled with a portion of the bit cell rows,
wherein, responsive to a first signal received from a corresponding individual compute circuitry, the corresponding SRAM sub-array causes switches separately included in the corresponding SRAM sub-array to open respective bitline circuits to isolate the bitlines coupled with all bit cell rows from the bitlines coupled with the portion of bit cell rows, the portion of bit cell rows to store look up table (LUT) entries that include multiplication results and to store a configuration block that includes instructions for the corresponding individual compute circuitry to execute a MAC operation using the multiplication results in the LUT entries.

2. The memory device of claim 1, comprising the corresponding SRAM sub-array to activate the second precharge circuitry following the opening of the respective bitline circuits to provide access to selected bit cells included in the portion of bit cell rows responsive to a read or a write request from the corresponding individual compute circuitry.

3. The memory device of claim 1, further comprising the corresponding SRAM sub-array to activate the second precharge circuitry following the opening of the respective bitline circuits to provide access to selected bit cells included in the portion of bit cell rows responsive to a read or a write request from the corresponding individual compute circuitry.

4. The memory device of claim 1, wherein the corresponding SRAM sub-array, responsive to a second signal received from the corresponding individual compute circuitry, causes the switches to close the respective bitline circuits, the corresponding SRAM sub-array to activate the first precharge circuitry to provide access to selected bit cells included in all bit cell rows responsive to a read or a write request from the corresponding individual compute circuitry.

5. The memory device of claim 1, comprising the plurality of SRAM sub-arrays and the plurality of compute circuitry included in a sub-bank of multiple sub-banks, the multiple sub-banks included in a bank of multiple banks, the multiple banks included in a slice of multiple slices of a cache for a processor, the cache to include a cache controller to configure a slice controller to control the slice, the slice controller to cause the configuration block to be stored to the portion of bit cell rows coupled with the second precharge circuitry, wherein the corresponding individual compute circuitry is to send the first signal responsive to an enable signal received from the slice controller.

6. The memory device of claim 5, the slice controller to send the enable signal to the plurality of compute circuitry responsive to the cache for the processor being switched to an accelerator mode to execute a processor-in-memory operation associated with a deep neural network workload.

7. The memory device of claim 1, the LUT entries that include multiplication results comprises multiplication results based on a product of multiplying 7 odd valued, 4-bit operands with the same 7 odd valued, 4-bit operands, the 7 odd valued, 4-bit operands to include odd values of 3, 5, 7, 9, 11, 13 and 15, wherein the LUT entries include 49, 8-bit values.

8. The memory device of claim 7, the configuration block that includes instructions for the corresponding compute circuitry to execute the MAC operation comprises the instructions to include an indication to execute a matrix multiplication MAC operation with 4-bit operands, a start address for the 4-bit operands, and an end address for the 4-bit operands, the start and the end addresses located in bit cell rows of the corresponding SRAM sub-array that are separate from the portion of bit cell rows to store the LUT entries.

9. The memory device of claim 8, wherein if both 4-bit operands to be multiplied as part of the matrix multiplication MAC operation have odd values, the corresponding compute circuitry to access product results of the multiplied, odd 4-bit operands of the matrix multiplication from the LUT entries.

10. The memory device of claim 8, wherein if both 4-bit operands to be multiplied as part of the matrix multiplication MAC operation have even values that are non-powers of two, the corresponding compute circuitry is to decompose both 4-bit operands into multiples of an odd number value and a power of two, and shift a partial product obtained from the LUT entries.

11. The memory device of claim 8, wherein if either of the 4-bit operands to be multiplied as part of the matrix multiplication MAC operation are powers of two, the corresponding compute circuitry is to shift a non-power of two operand's value by a value of a power of two operand.

12. A system comprising:
a processor; and
a static random access memory (SRAM) cache for the processor that includes:
a cache controller; and
a plurality of slices, each slice to include a slice controller, each slice to also include a plurality of banks, each bank to include a plurality of sub-banks, each sub-bank to include a plurality of sub-arrays coupled with a plurality of compute circuitry, individual compute circuitry from among the plurality of compute circuitry arranged to access data maintained in a corresponding sub-array from among the plurality of sub-arrays to enable the individual compute circuitry to execute a multiply and accumulate (MAC) operation, the plurality of sub-arrays to each include:
a first precharge circuitry to precharge bitlines coupled with all bit cell rows; and
a second precharge circuitry to precharge bitlines coupled with a portion of the bit cell rows,
wherein, responsive to a first signal received from a corresponding individual compute circuitry, the corresponding sub-array causes switches separately included in the corresponding sub-array to open respective bitline circuits to isolate the bitlines coupled with all bit cell rows from the bitlines coupled with the portion of bit cell rows, the portion of bit cell rows to store look up table (LUT) entries that include multiplication results and to store a configuration block that includes instructions for the corresponding individual compute circuitry to execute a MAC operation using the multiplication results in the LUT entries.

13. The system of claim 12, comprising the corresponding sub-array to activate the second precharge circuitry following the opening of the respective bitline circuits to provide access to selected bit cells included in the portion of bit cell rows responsive to a read or a write request from the corresponding individual compute circuitry.

14. The system of claim 12, wherein the corresponding sub-array, responsive to a second signal received from the corresponding individual compute circuitry, causes the switches to close the respective bitline circuits, the corresponding sub-array to activate the first precharge circuitry to provide access to selected bit cells included in all bit cell rows responsive to a read or a write request from the corresponding individual compute circuitry.

15. The system of claim 12, comprising the corresponding individual compute circuitry to send the first signal responsive to an enable signal received from the slice controller.

16. The system of claim 15, the slice controller to send the enable signal to the plurality of compute circuitry responsive to the SRAM cache for the processor being switched to an accelerator mode to execute a processor-in-memory operation associated with a deep neural network workload.

17. The system of claim 12, the LUT entries that include multiplication results comprises multiplication results based on a product of multiplying 7 odd valued, 4-bit operands with the same 7 odd valued, 4-bit operands, the 7 odd valued, 4-bit operands to include odd values of 3, 5, 7, 9, 11, 13 and 15, wherein the LUT entries include 49, 8-bit values.

18. The system of claim 17, the configuration block that includes instructions for the corresponding compute circuitry to execute the MAC operation comprises the instructions to include an indication to execute a matrix multiplication MAC operation with 4-bit operands, a start address for the 4-bit operands, and an end address for the 4-bit operands, the start and the end addresses located in bit cell rows of the corresponding sub-array that are separate from the portion of bit cell rows to store the LUT entries.

19. The system of claim 12, the processor comprises a central processing unit (CPU) having a plurality of cores, the plurality of slices separately assigned for direct access by a corresponding core from among the plurality of cores.

20. The system of claim 12, further comprising:
a display communicatively coupled to the processor;
a network interface communicatively coupled to the processor; or
a battery to power the processor and the SRAM cache.

21. A method, comprising:
receiving, at a compute circuitry coupled with a static random access memory (SRAM) sub-array, an enable signal from a controller of a memory device;

sending a first signal to the SRAM sub-array to cause first bitlines coupled to a first portion of bit cell rows of the sub-array to be isolated from second bitlines coupled to a second portion of bit cell rows of the sub-array, the first portion of bit cell rows to store look up table (LUT) entries that include multiplication results and to store a configuration block that includes instructions for the compute circuitry to execute a multiply and accumulate (MAC) operation using the multiplication results in the LUT entries;
causing a first precharge circuitry that is dedicated to the first bitlines to precharge the first bitlines to enable access to selected bit cells included in the first portion of bit cell rows; and
sending a read or write request to access the selected bit cells in the first portion of bit cell rows.

22. The method of claim 21, the first signal to cause first bitlines coupled to a first portion of bit cell rows of the SRAM sub-array to be isolated from second bitlines coupled to a second portion of bit cell rows of the SRAM sub-array comprises the first signal to cause switches included in the SRAM sub-array to open respective bitline circuits to isolate the first bitlines coupled with the first portion of bit cell rows from the second bitlines coupled with the second portion of bit cell rows.

23. The method of claim 22, further comprising:
sending a second signal to the SRAM sub-array to cause the switches to close the respective bitline circuits,
causing a second precharge circuitry to precharge bitlines coupled to the first and second bit cell rows to enable access to selected bit cells included in the first and second bit cell rows; and
sending a read or a write request to access the selected bit cells included in the first and second bit cell rows.

24. The method of claim 21, comprising the SRAM sub-array and the compute circuitry included in a sub-bank of multiple sub-banks, the multiple sub-banks included in a bank of multiple banks, the multiple banks included in a slice of multiple slices of a cache for a processor, the cache to include a cache controller to configure a slice controller to control the slice, the slice controller to cause the configuration block to be stored to the first portion of bit cell rows coupled with the first precharge circuitry dedicated to the first portion of bit cell rows, wherein the compute circuitry sends the first signal responsive to receiving an enable signal from the slice controller.

25. The method of claim 24, the slice controller to send the enable signal to the compute circuitry responsive to the cache for the processor being switched to an accelerator mode to execute a processor-in-memory operation associated with a deep neural network workload.

* * * * *